F. DÖPPENSCHMITT.
JEWELRY FABRIC.
APPLICATION FILED AUG. 2, 1910.

1,162,463.

Patented Nov. 30, 1915.

Witnesses
Ida G. Gilmore
Helen M. Dames

Inventor
Friedrich Döppenschmitt
by
Nicholas N. Goodlett, Attorney

UNITED STATES PATENT OFFICE.

FRIEDRICH DÖPPENSCHMITT, OF PFORZHEIM, GERMANY.

JEWELRY FABRIC.

1,162,463.  Specification of Letters Patent. Patented Nov. 30, 1915.

Application filed August 2, 1910. Serial No. 575,090.

*To all whom it may concern:*

Be it known that I, FRIEDRICH DÖPPENSCHMITT, a subject of the German Emperor, residing at Pforzheim, in Germany, have invented a certain new and useful Improvement in Jewelry Fabric, of which the following is a specification.

Chain work composed of circular rings is well known in jewelry, in which each ring of any one row engages two rings of the next row above and below, so that each ring of a given row is engaged in common by two adjacent rings of the next rows, one of which adjacent rings also engages the next ring of the given row, by which means connection is afforded throughout the fabric in both directions. Such a fabric is very suitable for purposes in which a surrounding frame can be used, or where the chain work is not intended to be left with a raw or unprotected edge, but it is unsuitable for such purposes as bracelets, dress rings, chatelaines, dog collars, waist belts, or other purposes where the chain is to form a band or strip, the edges of which are exposed and unprotected.

The purpose of the present invention is to provide a completing and strengthening edging to such chain capable of application to its side edges.

Figure 1:
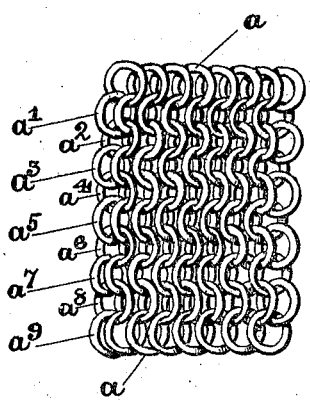

Figure 1 illustrates a portion of the chain referred to comprising ten rows of circular rings connected as above described. The tendency of the rings is to lie in parallel planes inclined to the general plane of the chain work, one horizontal row inclining for example to the right and the next horizontal row to the left and so on alternately. The end ring at the one or other end of the row, as the case may be, tends to, project beyond the end ring of the next row, and not only is this unsightly but it detracts from the strength of the edge of the chain work where strength is especially needed and affords more opportunity for catching or breaking the chain on adjacent objects. To avoid this, the present invention consists in combining with a chain of the nature described, a plurality of border rings, the diameter of which in one direction is the same as that of the rings composing the chain, but in the other direction is less, these border rings being used at the ends of alternate rows to connect the projecting ring of such a row to the projecting ring of the next row but one.

The invention is illustrated in the accompanying drawings, in which, however, the size of the links or rings forming the fabric considerably exceeds the sizes which will generally be used.

Figures 2, 3:
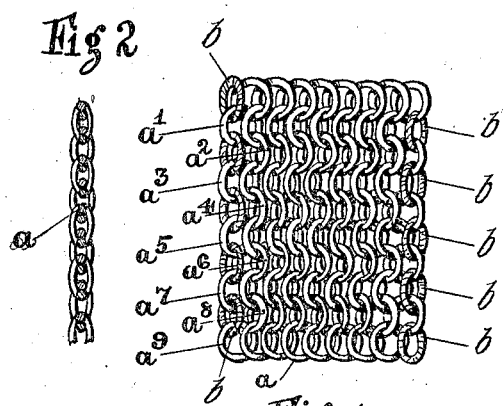
Figure 4:
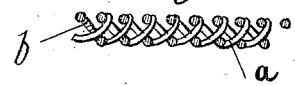
Figure 5:
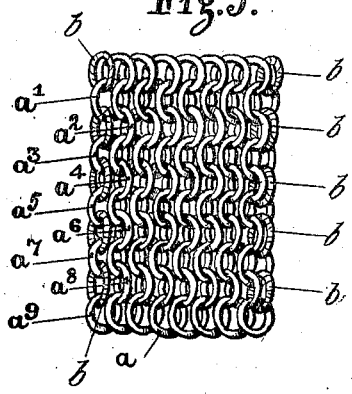
Figure 6:
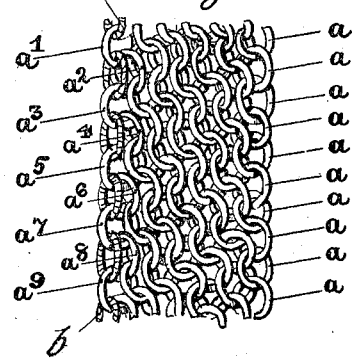
Figure 7:
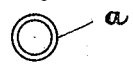
Figure 8:

In the drawings, Figure 1 is an elevation of a portion of the strip without the coupling members at the longitudinal edges (the latter being the vertical edges in the drawing). Fig. 2 is a longitudinal section of the fabric, Fig. 3 an elevation with the coupling members, and Fig. 4 a cross-section. Fig. 5 is an elevation showing a modified arrangement of the coupling members. Fig. 6 is an elevation showing a modification of the fabric in which the rings are connected in oblique or biased rows. Fig. 7 shows one of the normal circular links, and Fig. 8 shows one of the border rings.

Like reference characters denote like parts throughout the drawings.

As shown in Fig. 1, the strip of fabric consists of parallel interlinked, transverse rows of rings $a$, the rings in each row overlapping each other in the manner of scales. The rings composing alternate rows are inclined toward the right and left respectively. The texture of the fabric may be modified by biasing the rows of overlapping rings.

In Figs. 1 and 3, consecutive terminal rings on the left-hand side of the strip are marked $a^1$ to $a^9$. Fig. 3 shows the projecting alternate rings in this series connected to each other by coupling members consisting of elliptical links $b$, similar links $b$ being shown on the right hand side of the strip. The major diameter of the elliptical link is equal to the diameter of the circular links used in the body of the fabric. Its minor diameter is approximately equal to half the major diameter. The links $b$ span the gaps between the projecting rings $a^1$ $a^3$, etc., and impart a finished appearance to the fabric (as will be seen by comparison of Figs. 1 and 3), in addition to strengthening the fabric by forming a continuous border.

In Fig. 3 the links $b$ at opposite sides of the fabric are not directly opposite each other, each link $b$ on one side being opposite a gap between two links $b$ on the other side. In the modification shown in Fig. 5 the links $b$ are directly opposite each other.

The wire rings composing the fabric, and the coupling members at the borders, may be either plain or ornamental.

What I claim as my invention and desire to secure by Letters Patent of the United States is:—

An ornamental strip of jewelry fabric adapted for the making of bracelets, belts, rings, and other articles finished ready for wear, comprising parallel transverse rows of separate metal rings, each ring in each row, except the end rings in alternate rows, being interlinked with the two proximate rings in the adjacent rows, such interlinking positioning each ring in staggered relationship to its said proximate rings, whereby the said end rings of alternate rows extend beyond the end rings of the remaining rows; and a series of separate ornamental strengthening links interlinked respectively with the first-named end rings, said links being elliptical in outline and each having its minor axis of a length substantially equal to half the diameter of the rings, whereby the staggered relationship of the rings is compensated for and the said first-named end rings and the links form with each other a substantially straight and unbroken edge for the strip.

In witness whereof I have signed this specification in the presence of two witnesses.

FRIEDRICH DÖPPENSCHMITT.

Witnesses:
N. R. SHAUK,
W. W. SCHMIDT.